H. PREVÔT.
Improvement in Sun-Stroke Protectors for Head Coverings.
No. 115,894.  Patented June 13, 1871.
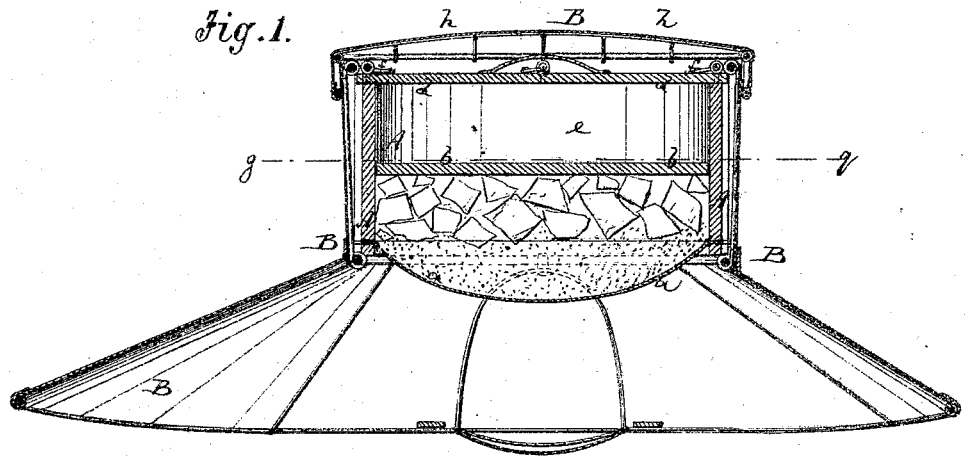
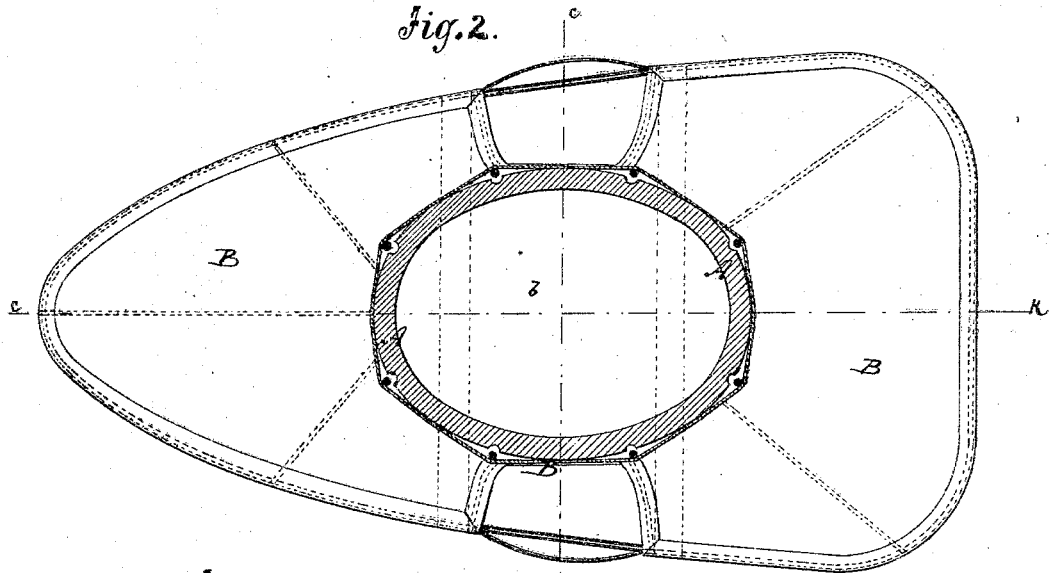
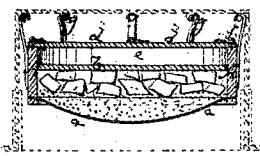
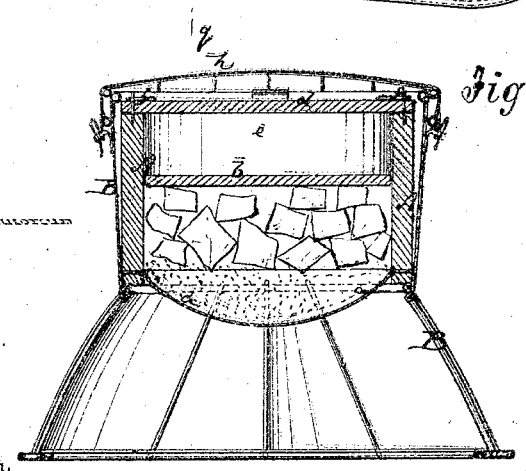
Witnesses:
A. Bennerendorf
Wm. H. C. Smith
Inventor:
H. Prevôt
per
Attorneys.

115,894

UNITED STATES PATENT OFFICE

HELLWIG PRÉVÔT, OF NEW YORK, N. Y.

IMPROVEMENT IN SUN-STROKE PROTECTORS FOR HEAD-COVERINGS.

Specification forming part of Letters Patent No. 115,894, dated June 13, 1871.

*To all whom it may concern:*

Be it known that I, HELLWIG PRÉVÔT, of New York city, in the county and State of New York, have invented a new and Improved Sun-Stroke Protector; and I do hereby declare that the following is a full, clear, and exact description thereof, which will enable others skilled in the art to make and use the same, reference being had to the accompanying drawing forming a part of this specification, in which—

Figure 1 represents a vertical central section of my improved sun-stroke protector, the line *c k*, Fig. 2, indicating the plane of section. Fig. 2 is a horizontal section of the same on the line *g q*, Fig. 1. Fig. 3 is a transverse section of the same on the line *e q*, Fig. 2. Fig. 4 is a detail transverse section of the invention, showing it applied to a hat.

Similar letters of reference indicate corresponding parts.

To cool the heads of men and animals during hot weather, protect them from the rays of the sun, and, at the same time, keeping the moisture of the cooling substance reaching away from the skin, are the objects of this invention.

For this purpose I have provided a hood or hat with a removable ice-receptacle, whose flexible bottom is lined or treated with rubber to be water-tight. The receptacle has also a double top or cover to form an air-chamber above the cooling substance.

A in the drawing represents a box of cylindrical, oval, or other suitable shape, made of wood or other non-heat-conducting material, with a flexible bottom, *a*, which is made of rubber or lined therewith to be water-tight. This box fits the crown of a hat or hood, B, which is placed on the head of the man or animal to be protected. Figs. 1, 2, and 3 show it in a hood for the protection of horses, while in Fig. 4 the box is shown in a gentleman's hat. Within the box is placed sawdust, and upon that some ice. A false cover, *b*, is put upon the ice, and then an upper cover, *d*, over the entire box. An air-chamber, *e*, is thus formed above the ice to preserve the same. As the ice melts its moisture will be absorbed by the sawdust. The bottom *a* of the box is within close proximity of or in absolute contact with the head of the person or animal, and it cools it by means of the cold substance which it supports. The water-tight quality of the bottom *a* prevents the moisture from reaching the head and injuring it. Suitable clasps or catches, *f f*, serve to secure the cover *d* to the box. The entire box can be put into the hat or hood from below, and has, in that case, spring-catches *g*, as in Fig. 4, or equivalent devices for holding it in place; or the box is applied from above, in which case the hood is open on top, or has a removable cap, *h*.

Having thus described my invention, what I claim as new, and desire to secure by Letters Patent, is—

1. The sun-stroke protector, consisting of the box A, with flexible water-tight bottom *a*, substantially as herein shown and described.

2. The double cover *b d*, combined with the box A and flexible bottom *a*, substantially as herein shown and described.

3. The combination, with the hood B, of the box A, as specified.

HELLWIG PRÉVÔT.

Witnesses:
A. V. BRIESEN,
WILHELMINE PRÉVÔT.